(12) United States Patent
Halliburton et al.

(10) Patent No.: US 9,186,594 B2
(45) Date of Patent: Nov. 17, 2015

(54) ILLUMINATED BALLOON

(75) Inventors: James Halliburton, Crewe (GB); Tony Rhoades, Altrincham (GB); Sean Tisdall, Cheadle (GB); James Bishop, Leighton Buzzard (GB)

(73) Assignee: SEATRIEVER INTERNATIONAL HOLDINGS LIMITED, Lostock Gralam, Northwich (GB)

( * ) Notice: Subject to any disclaimer, the term of this patent is extended or adjusted under 35 U.S.C. 154(b) by 0 days.

(21) Appl. No.: 14/005,003

(22) PCT Filed: Mar. 15, 2012

(86) PCT No.: PCT/GB2012/050568
§ 371 (c)(1),
(2), (4) Date: Sep. 27, 2013

(87) PCT Pub. No.: WO2012/123747
PCT Pub. Date: Sep. 20, 2012

(65) Prior Publication Data
US 2014/0011420 A1    Jan. 9, 2014

(30) Foreign Application Priority Data
Mar. 16, 2011  (GB) ................................. 01104442.7

(51) Int. Cl.
*A63H 27/10* (2006.01)
*B64B 1/40* (2006.01)

(52) U.S. Cl.
CPC *A63H 27/10* (2013.01); *B64B 1/40* (2013.01); *A63H 2027/1058* (2013.01); *B64D 2203/00* (2013.01)

(58) Field of Classification Search
CPC ............ A63H 27/10; B64B 1/00; B64B 1/02; B64B 1/40; B64B 1/58; B64D 1/02; B64D 2700/62508

USPC ........ 446/220–226; 244/32, 125, 126, 138 R, 244/139, 144
See application file for complete search history.

(56) References Cited

U.S. PATENT DOCUMENTS 1,890,083 A * 12/1932 Graeff ...................... 244/138 R
2,415,818 A *  2/1947 Frieder et al. .................. 244/32
(Continued)

FOREIGN PATENT DOCUMENTS

CN    201 684 419    12/2010
WO    WO 2008/110832    9/2008

OTHER PUBLICATIONS

UK Search Report for Application No. GB1104442.7.
(Continued)

*Primary Examiner* — Michael Dennis
*Assistant Examiner* — Urszula M Cegielnik
(74) *Attorney, Agent, or Firm* — Notaro, Michalos & Zaccaria P.C.

(57) ABSTRACT

In respect of a balloon (10) having an illumination device (20), including a light emitting member, which is mounted onto the wall inside the balloon cavity, at least one sheet (22, 24) of flexible material is connected to the illumination device inside the balloon cavity to serve as a parachute for the illumination device (20) in the event of rupture of the wall of the balloon when in an inflated condition. In embodiments where the illumination device is provided with a projection (12) and is mounted to the wall of the balloon by an attachment element, such as elastic band (18), engaging said projection from outside the balloon, the or each sheet of flexible material (22, 24) serving as the parachute may be connected to the illumination device (20) and to the balloon wall by location over the projection (12) and engagement by the same attachment member.

16 Claims, 4 Drawing Sheets

(56) References Cited

U.S. PATENT DOCUMENTS

| | | | |
|---|---|---|---|
| 2,444,642 A | 7/1948 | Frieder | |
| 2,680,577 A | 6/1954 | Frieder | |
| 2,793,824 A * | 5/1957 | D'Ooge | 244/32 |
| 3,130,739 A * | 4/1964 | Von Kohorn | 52/2.17 |
| 3,614,031 A * | 10/1971 | Demboski | 244/32 |
| 5,215,492 A * | 6/1993 | Kubiatowicz | 446/219 |
| 5,947,581 A | 9/1999 | Schrimmer | |
| 5,967,459 A * | 10/1999 | Hayashi | 244/32 |
| 6,276,815 B1 * | 8/2001 | Wu | 362/234 |
| 7,261,258 B1 * | 8/2007 | Fox, Jr. | 244/145 |
| 2004/0127138 A1 | 7/2004 | Huang | |
| 2007/0167107 A1 * | 7/2007 | Petell et al. | 446/220 |
| 2008/0032589 A1 * | 2/2008 | Sun | 446/220 |
| 2008/0090487 A1 * | 4/2008 | Randall | 446/225 |
| 2009/0141491 A1 * | 6/2009 | Chu | 362/231 |
| 2009/0191787 A1 * | 7/2009 | Rubinstein | 446/220 |

OTHER PUBLICATIONS

PCT/GB2012/050568 International Preliminary Report on Patentability.

* cited by examiner

ILLUMINATED BALLOON

FIELD OF INVENTION

The present invention concerns a balloon comprising a flexible wall which is at least partially transparent or translucent and which has an illumination device mounted onto the wall inside the balloon cavity.

BACKGROUND ART

The applicant's earlier patent specification WO 2008/110832 discloses a party balloon, that is to say a toy balloon, having an illumination device mounted inside, the illumination device comprising a light emitting diode (LED) powered by at least one battery. The LED lights up when a strip of insulating material is withdrawn from between the battery and the LED to complete the circuit and the balloon is thereby illuminated from its interior.

In other versions of illuminated balloon, a switch may be provided which can be manually actuated to connect or disconnect a light source from its power source thereby selectively to illuminate the balloon cavity.

In the applicant's known party balloon the illumination device is mounted to the inside of the balloon wall by having a projection which is engaged from outside the balloon by an attachment element, such as a clip or a band, more specifically an O-ring of elastic material. Projections in the form of a partially spherical button or, more preferably a flattened button, were proposed.

Although the applicant's earlier specification is primarily concerned with a balloon formed in one piece of elastomeric material, such as latex, the manner of mounting the illumination device inside the wall by means of a projection engaged from outside by a clip or band or similar is also applicable to a balloon formed from two sheets of flexible material connected around their edges, the sheeting being formed of substantially inelastic material, such as metallised plastics material or Mylar.

However, other means of mounting an illumination device to the wall of a balloon are possible. For example the device may be attached by adhesive when the balloon wall material is of the substantially inelastic type.

Typically it is intended that the illumination device should only operate once the balloon is inflated so as to light up the inflated balloon.

In the event that the balloon bursts when inflated, the illumination device which has been mounted inside may be flung out at some speed.

OBJECT OF THE INVENTION

An object of the present invention is to reduce the speed of any projectile resulting from a bursting balloon, such as a flying or falling illumination device.

SUMMARY OF THE INVENTION

The present invention provides a balloon comprising a flexible wall defining a balloon cavity and having an inlet portion defining an opening into the balloon cavity through which gas under pressure can be directed to inflate the balloon, said wall being at least partially transparent or translucent, an illumination device including a light emitting member which is mounted to the wall inside the balloon cavity; and a sheet of flexible material connected to the illumination device inside the balloon cavity, this sheet being configured to serve as a parachute for the illumination device in the event of rupture of the wall of the balloon when in an inflated condition.

The term "parachute" as used herein is defined as an umbrella shaped piece of fabric of high drag to retard the descent of a falling body or reduce the speed of a moving/flying body.

In preferred embodiments a second sheet of flexible material is connected to the illumination device inside the balloon cavity, the first and second sheets together serving as the parachute. An arrangement which is particularly advantageous for efficient production of balloons incorporating such a two sheet parachute is that the first and second sheets should have a common connection to the illumination device. Furthermore the first and second sheets preferably overlie each other for at least about half of their respective areas.

In other embodiments the parachute may be formed by a single sheet, or by three sheets of flexible material, or more than three sheets.

BRIEF DESCRIPTION OF THE DRAWINGS

The invention will be described further, by way of example, with reference to the accompanying drawings, in which.

DETAILED DESCRIPTION

One particular practical embodiment of the balloon of the invention is a balloon 10 formed of latex which is inherently transparent or translucent when it is stretched when the balloon is inflated. An illumination device 20 is mounted onto the wall of the balloon, inside the balloon, at a location generally opposite to the inlet portion through which the balloon is inflated in use.

Figure 3:
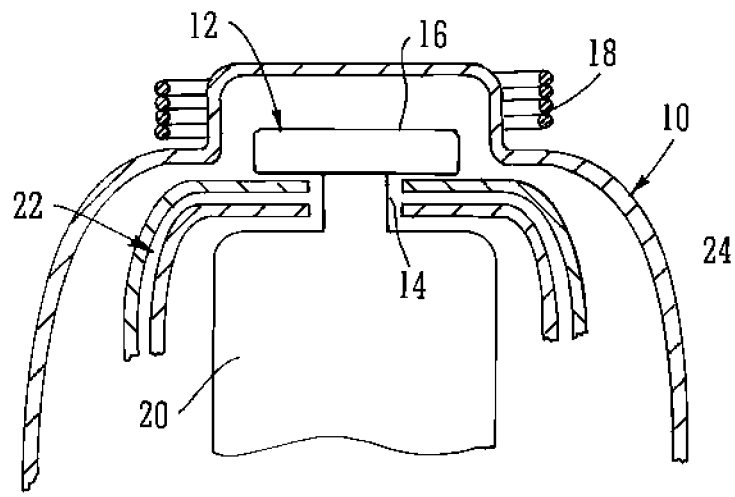
FIG. 3 is a fragmentary cross-section sketch showing how the parachute structure and balloon wall are to be attached to the illumination device.
Figure 4:
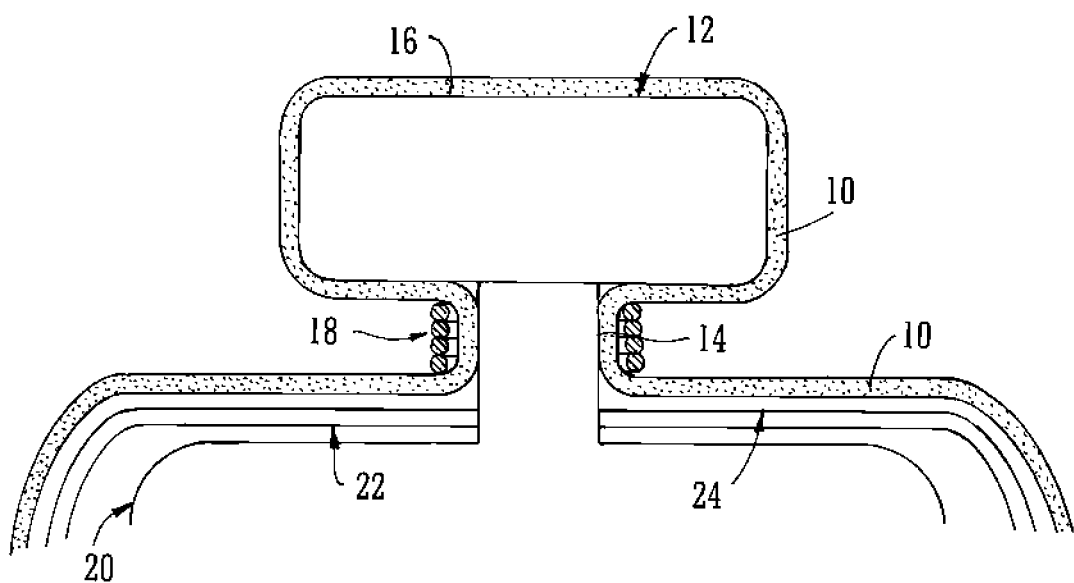
FIG. 4 is a similar view to FIG. 3, but of enlarged scale, showing the same component parts when the connection is completed.

The precise form of the illumination device 20 is not important to the present invention but it will typically include an LED or other light source and at least one battery power source to which the light source is connected in use, for example by removal of a strip of insulating material, an end of which is initially interposed between contacts for the light source and battery. The LED and battery or batteries are mounted in a frame or housing which provides a projection 12 enabling attachment of the illumination device. The projection is typically formed with a neck portion 14 and an enlarged head 16. An enlarged head 16 in the form of a flat circular disc, namely a short cylindrical form, is particularly suitable and is the form shown in the accompanying FIGS. 3 and 4. However, other configurations are possible. An elastic band (rubber band) 18 engages over the projection 12 from outside the balloon wall, seating into the neck portion 14 to reliably hold the illumination device 20. As shown in FIGS. 3 and 4 the band 18 is typically twisted several times as it is applied in order to make a tight connection between the balloon material 10 and the neck 14 of the illumination device 20.

Figure 1:
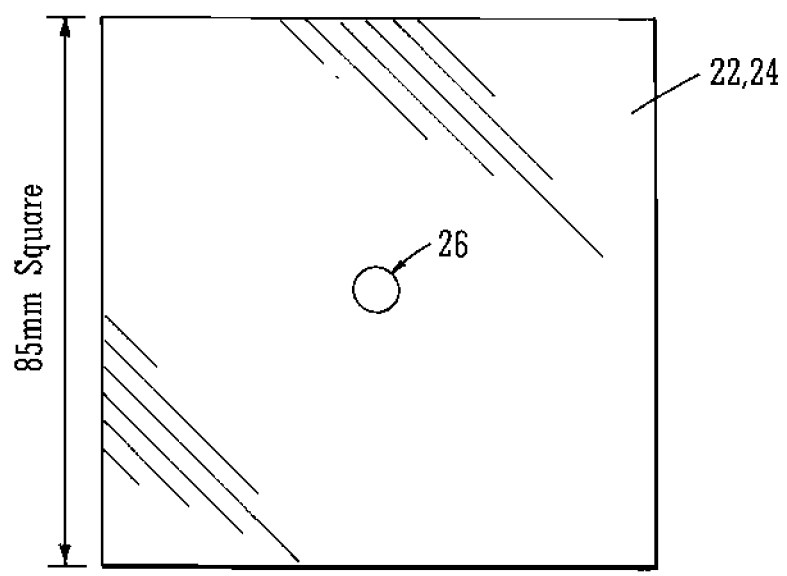
FIG. 1 shows a sheet of material for forming the parachute structure.
Figure 2:
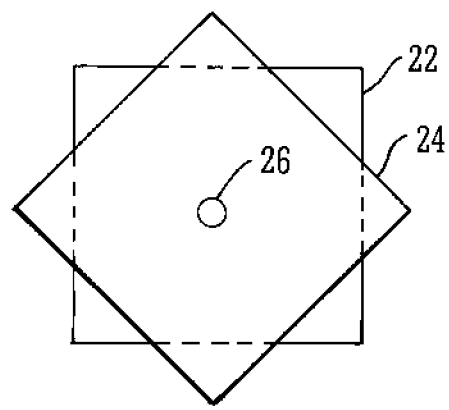
FIG. 2 is a reduced scale plan view showing the positioning of two sheets when forming the parachute structure.

Two sheets of polyethylene 22, 24, as shown in FIG. 2, are attached to the illumination device 20 to serve as a parachute for the device 20 in the event of bursting of the inflated balloon. By way of example, and as shown in FIGS. 1 and 2, the sheets are square sheets of low density polyethylene of a size 85 mm×85 mm. This size is chosen as about the maximum permissible to avoid being considered as a choking or suffocation hazard in respect of a balloon which has burst and may be picked up by children. A suitable thickness of polyethylene is from 0.03 mm to 0.05 mm, again around the maximum permissible for the same safety reason. The two sheets 22, 24 are each connected at a generally central position to the end of the illumination device. They overlie each other to a considerable extent, for at least half their respective areas. Preferably, as shown in FIG. 2, they are orientated to be offset through 90° relative to each other.

Figure 5:
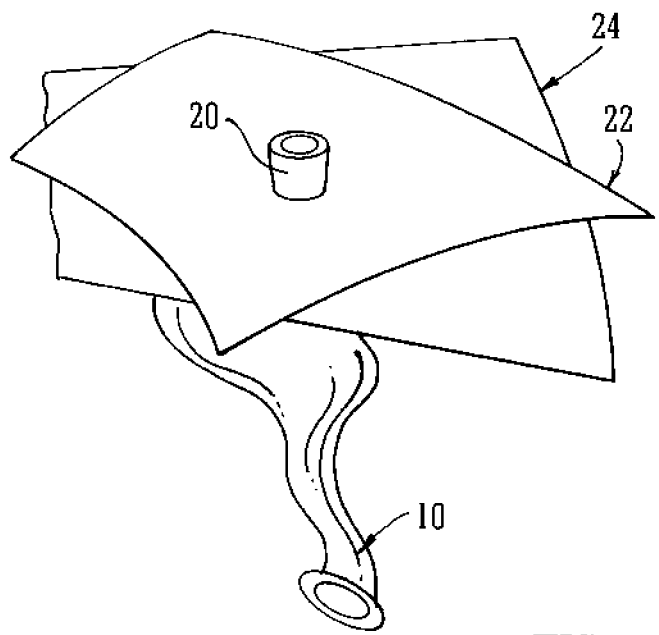
FIG. 5 is a sketch showing the balloon with the parachute structure after it has been inflated and has exploded.

To make the connection each sheet 22, 24 is provided with a small hole 26 at a central location and this is passed over the head portion 16 of the projection 12 of the illumination device 20 before the illumination device is secured to the inside of the balloon wall. In the subsequent manufacturing step, shown in FIGS. 3 and 4, the sheets 22, 24 are held in position by the same band 18 which secures the illumination device 20. Then in the event of explosion of the balloon 10 after it has been inflated, the sheets remain 22, 24 attached to the illumination device 20, namely the aforementioned LED module, and the relevant fragment of balloon wall, and serve as a parachute, slowing the speed of the LED module and reducing the force of any impact it makes. This is illustrated schematically in FIG. 5.

When such a balloon bursts from a full inflated condition, the LED module 20 may be hurled in any direction at a speed of about 30 m sec$^{-1}$ in reaction to the release of the pressurised gas. Tests have shown that with the provision of a parachute of this form the velocity of the LED module 20 may be reduced, typically by 30%, but even by as much as 70%, thereby reducing risk of any damage or injury being caused as a result of impact of the module.

The aforesaid description is illustrative, not limitative, of the invention and many variations are possible within the scope of the appended claims. As previously mentioned in other embodiments a single sheet of flexible material may provide the parachute or three or more sheets of flexible material, overlying each other to some extent, may provide the parachute.

Figure 6:
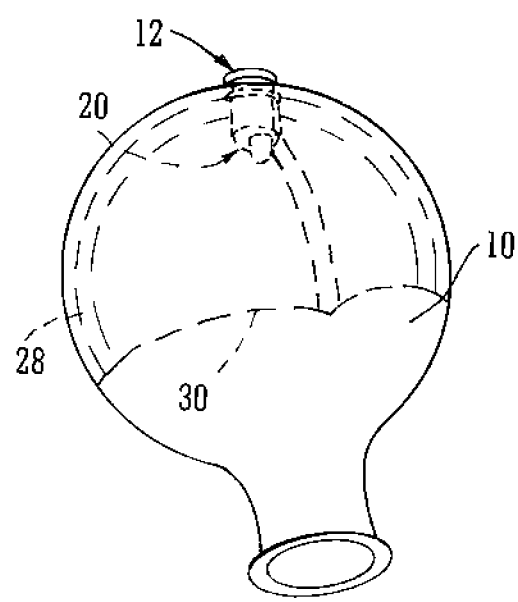
FIG. 6 is a sketch showing a modified embodiment of a balloon in accordance with the invention in un-inflated condition.
Figure 7:
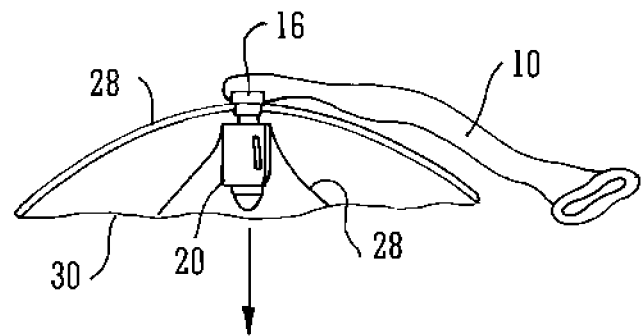
FIG. 7 shows the balloon of FIG. 6 after inflation and rupture.
Figure 8:
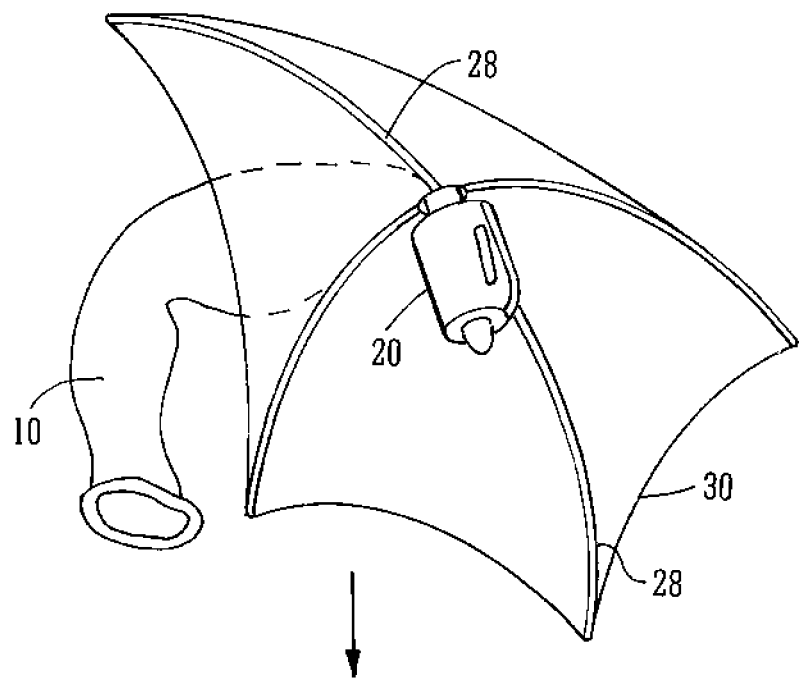
FIG. 8 shows a slightly different view and to a larger scale of the balloon of FIG. 6 after inflation and rupture.

In a modified embodiment illustrated in FIGS. 6 to 8, a single sheet of polyethylene 30 provides the parachute and this sheet is formed with reinforcing ribs 28 extending from a central region towards the edge of the sheet. The reference numerals used to designate other parts are the same as in the preceding figures as these parts correspond. With a square or rectangular sheet such ribs 28 are suitably four in number, extending towards the respective corners. The purpose of these ribs 28 is to ensure that as the sheet 30 forms the parachute, upon bursting of the inflated balloon 10, it opens out and remains spread outwards without tending to fold back on itself. In this respect it is generally preferred that the sheet 30 extends from the central connection to the LED module 20 at an angle between 170° to 180°. The ribs 28 facilitate this. The ribs 28 are preferably provided on the surface of the sheet 30 facing towards the balloon wall in the initial assembled un-inflated and subsequently inflated condition. The ribs 28 may introduce a certain curvature to the shape of the deployed parachute, as shown in FIG. 7.

In a further development, the ribs 28 are preferably of such height/thickness and have ends sufficiently close to the head 16 of the projection 12 that those ends contact the projection as the parachute spreads and inhibit opening of the sheet 30 (or multiple sheets in other embodiments) beyond a predetermined angle, such as 180°. The ribs may taper in height/thickness from adjacent the centre towards the edge of the sheet so that the ends of ribs at the centre are high enough to provide the required abutment to prevent opening beyond 180°. Such tapering may also result in helpful curvature of the deployed parachute configuration.

Many variations to the above are possible in other embodiments. For example, there may be only a single sheet forming the parachute or there may be two, three or more than three sheets. The sheet or sheets need not be square, and may be circular or any other shape found to be suitable. The exact size, thickness and composition of the sheet material may vary and will be selected to optimise performance and ease of assembly of the illuminated balloon product and minimise cost. Where ribs are provided, any suitable number may be provided. For example, in respect of a circular sheet, three equally spaced ribs may be sufficient.

Although particularly designed in respect of illuminated latex party balloons, the invention is applicable to all types of balloon, including balloons of other material, particularly inelastic material, and balloons which are for other purposes than as toys or party decorations.

Furthermore, the sheet or sheets providing the parachute may be connected to the illumination device in a manner different to that described above in respect of the illustrated embodiments, and the illumination device itself may be attached to the wall of the balloon in a manner different to that described above in respect of the illustrated embodiments.

The invention claimed is:

1. A party balloon comprising:
    a flexible wall having an outer surface and an inner surface, the inner surface defining a balloon cavity, the flexible wall having an inlet portion defining an opening into the balloon cavity through which gas under pressure is directed into the balloon cavity in order to inflate the balloon, said wall being at least partially transparent or translucent;
    a self-contained illumination device comprising a frame, and a light emitting LED diode and a battery source for the LED diode which are together mounted in the frame, the frame being provided with a projection and the illumination device being mounted inside the balloon cavity to the inner surface of the flexible wall by an attachment element which engages from outside the balloon wall with the projection of the frame; and
    a parachute dimensioned for slowing the speed of movement of the illumination device in the event of rupture of the flexible wall of the balloon when the balloon is in an inflated condition, said parachute being in the form of a sheet of flexible material which is inside the balloon cavity and connected to the illumination device, this sheet of flexible material having a central region and a free periphery inside the balloon cavity and this sheet of flexible material being attached only at the central region directly to the illumination device, with the free periphery of this sheet being free of attachment.

2. A balloon as claimed in claim 1, wherein said parachute further comprises a second sheet of flexible material which is inside the balloon cavity and connected to the illumination device, this second sheet of flexible material also having a central region and a free periphery inside the balloon cavity and being attached to the illumination device only at the central region of this second sheet with the free periphery of this second sheet being free of attachment.

3. A balloon as claimed in claim 2, wherein the first and second sheets of flexible material have a common connection to the illumination device.

4. A balloon as claimed in claim 2, wherein the first and second sheets of flexible material overlie each other at least for about half their respective areas.

5. A balloon as claimed in claim 1, wherein said parachute further comprises at least two further sheets of flexible material which are inside the balloon cavity and connected to the illumination device inside the balloon cavity.

6. A balloon as claimed in claim 5, wherein the sheets of flexible material have a common connection to the illumination device.

7. A balloon as claimed in claim 1, wherein the sheet of flexible material is connected to the illumination device and to the flexible wall by location over the projection and engagement by the same attachment element.

8. A balloon as claimed in claim 7, wherein the attachment element is in the form of a clip or band.

9. A balloon as claimed in claim 8, wherein the attachment element is in the form of a band which is elastomeric.

10. A balloon as claimed in claim 9, wherein the attachment element is in the form of a band which is a closed loop.

11. A balloon as claimed in claim 1, wherein the sheet of flexible material is formed of polyethylene.

12. A balloon as claimed in claim 1, wherein the sheet of flexible material is provided with ribs extending outwards from the central region of the sheet of flexible material.

13. A balloon as claimed in claim 12, wherein the sheet of flexible material is rectangular and four ribs are provided extending from the central region towards respective corners of the sheet of flexible material.

14. A balloon as claimed in claim 1, wherein the sheet of flexible material is held between the illumination device and the inner surface of the flexible wall, the sheet of flexible material being held by the same attachment element which engages from outside the balloon with the projection of the frame.

15. A balloon as claimed in claim 1, wherein the sheet of flexible material forming the parachute is connected only at its central region to the flexible wall of the balloon as well as to the illumination device.

16. A party balloon comprising:
a flexible wall having an outer surface and an inner surface, the inner surface defining a balloon cavity, the flexible wall having an inlet portion defining an opening into the balloon cavity through which gas under pressure is directed into the balloon cavity in order to inflate the balloon, said wall being at least partially transparent or translucent;
a self-contained illumination device comprising a frame, and a light emitting diode and a battery source for the light emitting diode which are together mounted in the frame, the illumination device being mounted inside the balloon cavity to the inner surface of the flexible wall by an attachment element which engages from outside the balloon wall with a portion of the frame; and
a parachute in the form of a sheet of flexible material inside the balloon cavity and connected to the flexible wall and to the illumination device, this sheet of flexible material having a central region and a free periphery inside the balloon cavity;
wherein this sheet of flexible material is attached only at the central region directly to the illumination device, with the free periphery of this sheet being free of attachment such that in the event of rupture of the flexible wall of the balloon when the balloon is in an inflated condition the parachute slows the speed of movement of the illumination device.

* * * * *